United States Patent [19]

Cunningham et al.

[11] Patent Number: 4,953,444
[45] Date of Patent: Sep. 4, 1990

[54] BRAKE SERVO BOOSTER

[75] Inventors: Philip Cunningham, Newport; Stuart J. Briggs, Cwmbran, both of Great Britain

[73] Assignee: Lucas Industries public limited company, Birmingham, England

[21] Appl. No.: 304,245

[22] Filed: Jan. 31, 1989

[30] Foreign Application Priority Data

Feb. 2, 1988 [GB] United Kingdom ................ 8802297

[51] Int. Cl.$^5$ ........................................... F01B 25/26
[52] U.S. Cl. .................................... 91/1; 91/369.1
[58] Field of Search ................. 60/534, 545, 547.1, 60/548, 579, 582; 91/1, 369.1; 137/553, 554; 188/181 A, 345, 358, 359, 360; 200/61.89; 303/50, 52, 114, 119

[56] References Cited

U.S. PATENT DOCUMENTS

| | | | |
|---|---|---|---|
| 4,603,918 | 8/1986 | Leiber et al. | 60/545 |
| 4,718,324 | 1/1988 | Gautier et al. | 91/1 |
| 4,756,229 | 8/1988 | Drakeley | 92/5 R |

Primary Examiner—Edward K. Look
Assistant Examiner—Therese M. Newholm
Attorney, Agent, or Firm—Staas & Halsey

[57] ABSTRACT

A vehicle brake servo booster has a housing divided into pressure chambers by a movable partition carried by a reciprocable hub member. A switch device is mounted on the housing and operable by an abutment member carried by a reciprocable piston to control an electrical circuit supplying a vehicle rear brake warning light.

5 Claims, 1 Drawing Sheet

BRAKE SERVO BOOSTER

BACKGROUND OF THE INVENTION

This invention relates to a brake servo booster, primarily for use in a vehicle hydraulic braking system for the purpose of providing power assistance in the actuation of a brake master cylinder, and in which the supply of air to an integral or remote air actuated servo piston, usually in the form of a diaphragm assembly, is controlled by a valve mechanism which includes a reciprocable valve element operatively connected to a force input member and carrying an abutment member which engages a fixed part of the booster to set a retracted position of the valve element.

It is known to provide a brake servo booster with an electrical switch which is actuated by a component of the booster to control, for example, the switching of a vehicle stop light. One such prior proposal is described in U.S. Pat. No. 4718324 and incorporates a switch at the outer end of an axial extension of the booster housing, the switch being actuated to change its operative condition in response to inward movement of a force input rod. A disadvantage of such an arrangement is that the accommodation of the switch and its actuating mechanism requires a significant rearward increase in the length of the housing, which can give rise to installation difficulties when space in the axial dimension is limited.

SUMMARY OF THE INVENTION

An object of the invention is to provide an improved brake servo booster in which the aforesaid disadvantage is overcome.

According to the invention, a brake servo booster comprises a valve mechanism operable to control the supply of air to an integral or remote air-actuated servo piston, said valve mechanism including a reciprocable valve element operatively connected to a force input member and providing a valve seat for cooperation with a valve member, the valve element carrying a laterally extending abutment member arranged so that an extreme position of movement of the valve element is determined by engagement of the abutment member with a fixed surface, and switch means adapted for connection, in use, into an electrical circuit, said switch means being mounted in the vicinity of said valve element for actuation in response to movement of said abutment member with the valve element.

BRIEF DESCRIPTION OF THE DRAWINGS

The invention will now be described, by way of example, with reference to the accompanying drawings in which.

DETAILED DESCRIPTION OF THE PREFERRED EMBODIMENTS

Figure 1:
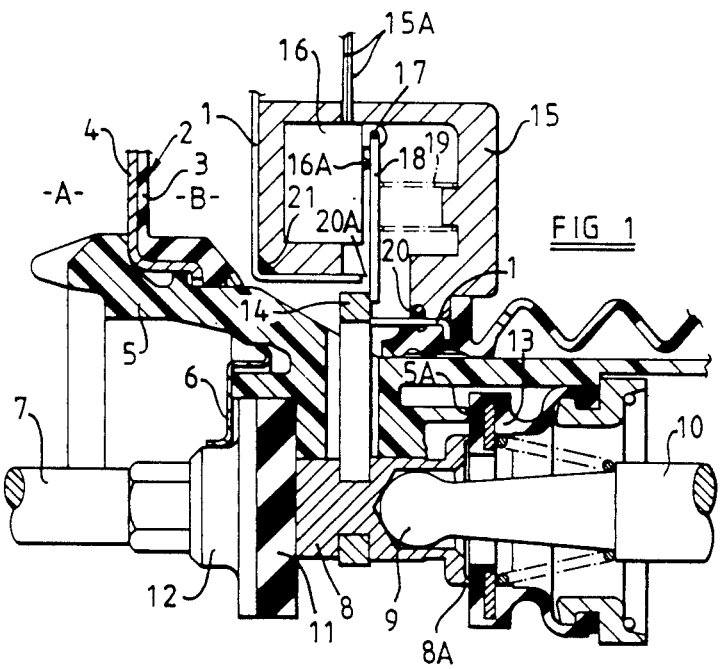
FIG. 1 is a side view, partly in longitudinal cross-section, of part of one form of the brake servo-booster of the invention.

Referring to FIG. 1, this shows part of a booster having a housing 1 of which the interior is divided into two chambers A and B by a diaphragm assembly 2 which includes a flexible diaphragm 3 and a relatively rigid diaphragm support plate 4, the latter being supported in its central region on a hub 5 which extends therethrough and would normally be urged to the right, as seen in the drawing, by a return spring (not shown). Retained within the hub 5 by a resilient retainer 6 is a force output rod 7 which would be connected, in use, to a piston of a master cylinder (not shown) forming part of a vehicle hydraulic braking system. The hub 5 also contains a valve control piston 8 which is allowed limited axial sliding movement within the hub and to which is crimped or otherwise secured a ball end 9 of a force input rod 10 connected, in use, to a driver-operated brake actuating pedal. A reaction disc 11 is interposed between the left hand side of the piston 8 and an enlarged head 12 of the output rod 7. The extreme right hand end portion of the piston 8 forms a valve seat 8A and the hub 5 forms a further valve seat 5A, both arranged to co-operate with a poppet valve assembly 13, in conventional manner. The piston 8 also carries a radially extending abutment member in the form of a key 14 which abuts against the housing 1 in the illustrated rest position of the booster in order to determine the retracted position of the piston 8.

Mounted on the housing 1 is a casing 15 containing a micro-switch 16. Pivotally mounted on the switch 16 at 17 is an actuating lever 18 which is urged by a spring 19 away from its illustrated position towards a leftwardly pivoted position in which it acts on a button 16A to actuate the micro-switch 16. The lever extends through a slot 20A in the booster housing 1 to a position in which it is engaged by the key 14 and retained thereby in the position shown in which the micro-switch is not actuated, when the booster is in its illustrated non-operative condition. The micro-switch is connected electrically by wires 15A into an electrical circuit for controlling, for example, a rear brake warning light of a vehicle. Because the housing 15 communicates via the slot 20A with the interior of the booster housing, it is necessary to provide seals 20, 21 between the switch housing 15 and booster housing 1 in order to maintain the fluid-tight integrity of the assembly.

With the booster inoperative, as illustrated, the key 14 is in its extreme rightward position in abutment with the housing 1 and holds the lever 18 against the action of the spring 19 in a position in which the micro-switch is not actuated. When input force is applied via the force input rod 10 to the piston 8, this immediately moves the key 14 away from the housing, enabling the lever 18 to be urged by the spring 19 to the left so as to actuate the micro-switch 16, the effect of which is to influence the electrical circuit in which the switch is incorporated so as to illuminate the rear brake warning light. It will be seen that, because the piston 8 and consequently the key 14 carried thereby, are the first components to move upon actuation of the booster, immediate illumination of the brake light is provided to warn a following driver that braking is taking place. When the booster components are returned to their illustrated positions, upon removal of actuating force from the rod 10, the micro-switch will be deactivated at the end of the working travel of the components, thereby ensuring that the brake warning light is not extinguished until substantially complete release of the brakes has taken place.

Figure 2:
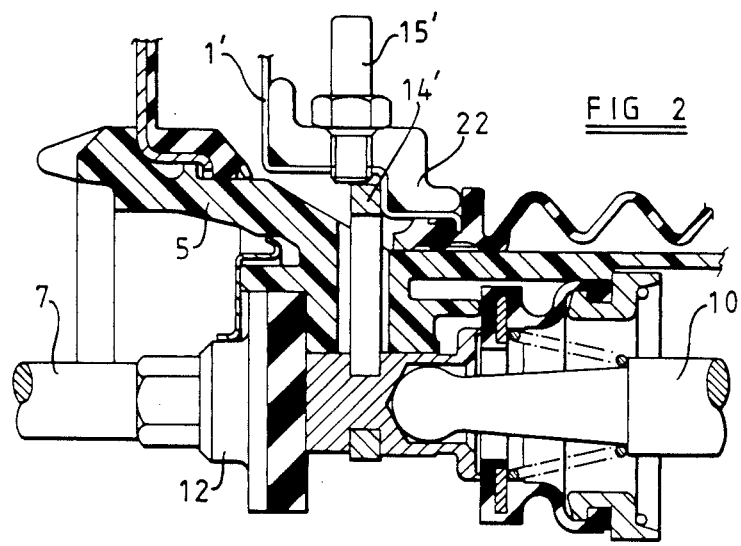
FIG. 2 is a view similar to FIG. 1 illustrating an alternative embodiment of the booster.

In the alternative arrangement illustrated in FIG. 2, the booster components are the same as those in FIG. 1, but the switch device is in the form of a proximity switch 15' mounted on a collar surrounding the housing 1' and extending through an aperture in the housing to a position in which the end thereof lies adjacent the path of reciprocable travel of the key 14'. The operation of the booster is exactly as described in relation to FIG. 1 and the switch is caused to emit an actuating signal to activate the brake warning light when the key 14' is moved out of alignment therewith. The signal ceases and the light is extinguished when the key returns to its illustrated position. It would, however, be possible for the switch and key to be positioned so as to work in the reverse manner, the key then moving into alignment with the switch as it moves away from its illustrated position upon actuation of the booster.

It will be understood that many variations can be made to the embodiments illustrated above. For example, the switch can take any other convenient form, such as a magnetic or reed switch and may be arranged either as an ON/OFF switch directly in the circuit supplying the warning light, or it may be arranged so as normally to complete a circuit acting to hold a relay in an OFF position, which then moves to its ON position to illuminate the lamp upon actuation of the switch, or vice versa. The invention may be applied to both single and tandem boosters.

The positioning of the switch in the vicinity of the valve member 8 not only provides a rapid response in terms of switch actuation upon movement of the force input rod, but also gives rise to an axially compact booster.

We claim:

1. A brake servo booster comprising:
    a valve mechanism operable to control the supply of air to an integral or remote air-actuated servo piston, said valve mechanism including a valve element operatively connected to a force input member and providing a valve seat for cooperation with a valve member,
    a laterally extending abutment member carried by the valve element and being arranged so that an extreme position of movement of the valve element is determined by engagement of the abutment member with a fixed surface, and
    switch means adapted for connection, in use, into an electrical circuit, said switch means being mounted in the vicinity of said valve element for actuation in response movement of said abutment member with the valve element.

2. A servo booster according to claim 1, wherein the switch means is urged by the abutment member into a first condition against the action of resilient means when the abutment member is engaged with said fixed surface and is urged by said resilient means into a second condition when the abutment member moves away from said surface.

3. A servo booster according to claim 1, wherein the switch means is a micro switch operated by a pivoted lever engageable by said abutment member, the lever being subject to the action of said resilient means.

4. A servo booster according to claim 1 wherein said switch means is contained in a separate casing attached to a housing of the booster containing said servo piston.

5. A servo booster according to claim 1 wherein said switch means is a proximity switch positioned adjacent the path of travel of said abutment member and being activated by movement of the abutment member to emit an electrical signal to operate said electrical circuit.

* * * * *